Oct. 9, 1951 W. A. ROTH 2,571,063
VANE TYPE HYDRAULIC CLUTCH
Filed March 12, 1948 2 Sheets-Sheet 1

Inventor
William A. Roth
By Robert M. Dunning

Oct. 9, 1951  W. A. ROTH  2,571,063
VANE TYPE HYDRAULIC CLUTCH
Filed March 12, 1948  2 Sheets-Sheet 2

Inventor
William A. Roth
By Robert M. Dunning

Patented Oct. 9, 1951

2,571,063

UNITED STATES PATENT OFFICE 2,571,063

VANE TYPE HYDRAULIC CLUTCH

William A. Roth, St. Paul, Minn.

Application March 12, 1948, Serial No. 14,599

13 Claims. (Cl. 192—58)

My invention relates to an improvement in hydraulic clutch or torque convertor wherein it is desired to provide a simple and effective means for connecting a drive shaft and a driven shaft to provide automatic control of torque.

It is a primary object of the present invention to provide a device having features similar to a rotary pump in combination with other elements including a governing device to provide automatic control of torque from zero to a maximum. This device may be used to connect any rotary drive member to a rotary driven member and is reversible in operation.

A feature of my invention lies in providing a hydraulic clutch which will circulate the hydraulic fluid only for relatively short periods of time during operation. During normal use the fluid in the clutch is held from circulation so that the driven element rotates at the same speed as the driving element. However, when the speed of the driven element is not the same as the speed of the driving element, circulation of fluid within the clutch takes place for the required period of time until the speed of the drive and driven elements is equalized. As soon as maximum torque is no longer required or when the speed of the drive and driven elements is equalized, the further circulation of fluid is again automatically prevented.

A further feature of the present invention lies in the provision of a hydraulic clutch that is designed for a great variety of uses, but which is particularly adapted for use as a drive for automobiles, trucks, tractors, locomotives and other vehicles.

An added feature of the present invention lies in the fact that my hydraulic clutch may be easily and inexpensively installed in a vehicle previously manufactured so as to convert the vehicle drive into fluid drive.

The structure of my present invention is an improvement upon my previous Patent No. 2,306,363.

These and other objects and novel features of my invention will be more clearly and fully set forth in the following specification and claims.

In the drawings forming a part of my specification:

Figures 1, 2, 6:
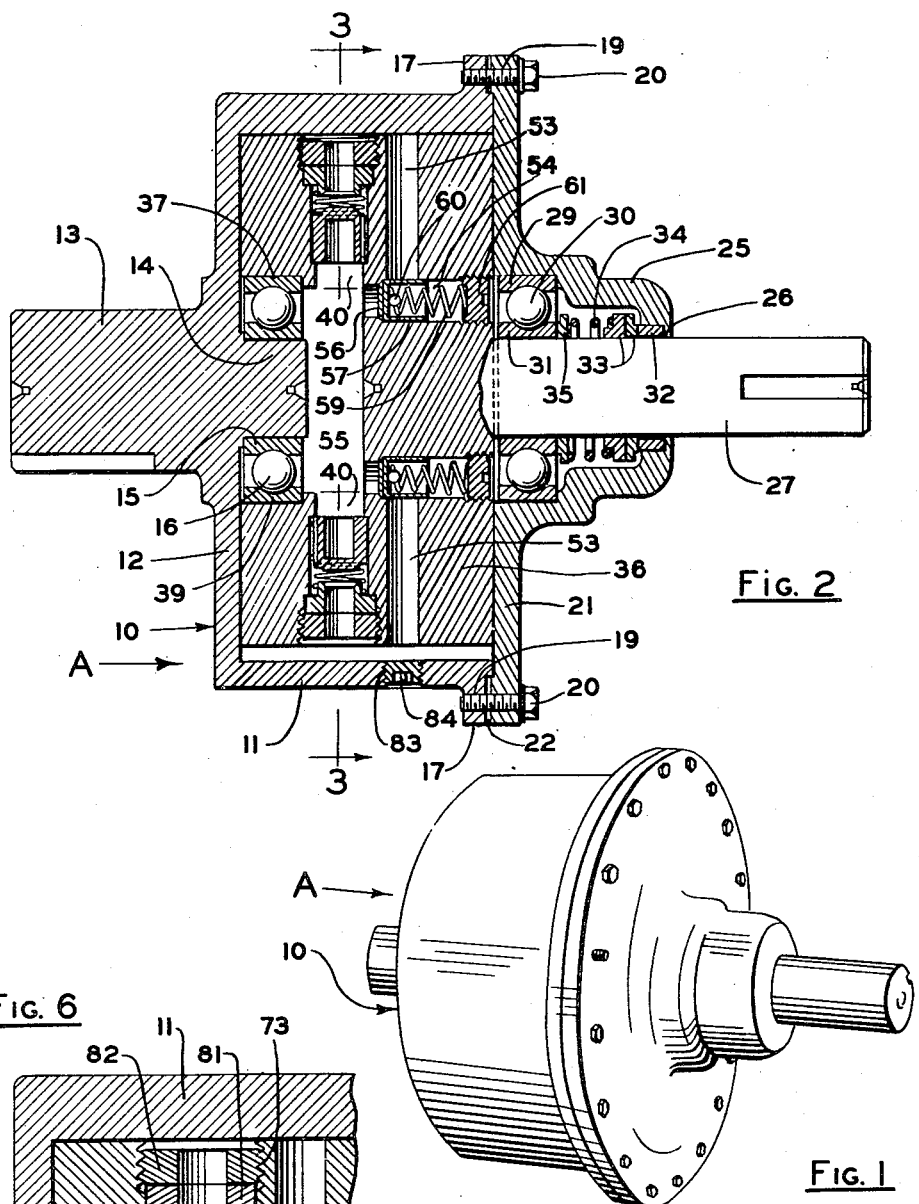
Figure 1 is a perspective view of my hydraulic clutch showing the outer shape thereof.
Figure 2 is a cross sectional view through the clutch showing the construction thereof.
Figure 6 is a sectional view similar to Figure 4 showing an alternate type of construction.

The clutch A includes a clutch housing which is indicated in general by the numeral 10. The housing 10 includes a hollow generally cylindrical shell 11 having a disc-like end 12 at one end thereof. The disc-like end closure 12 is provided with an axially projecting hub or extension 13 which is designed to be keyed or splined to a driven unit. An inner hub or extension 14 coaxial with the housing shell forms a support for the inner race 15 of a ball bearing 16.

The end of the encircling shell 11 opposite that supported by the disc-like member 12 is provided with an outwardly extending peripheral flange 17. This flange 17 is provided with a series of angularly spaced apertures 19 therethrough for accommodation of bolts or cap screws 20. These bolts or cap screws 20 connect the casing portion 10 to a disc-like casing closure plate 21 which acts to close the otherwise open side of the casing 10. A gasket 22 is interposed between the body 10 of the casing and the closure plate 21 to act as a seal therebetween.

The outer surface 23 of the shell 11 is concentric with the center of the bosses 13 and 14. The inner surface 24 of the outer shell 11 is eccentric with respect to the outer surface thereof, the center of curvature of the inner surface of the shell being spaced slightly below the center of the outer surface thereof in the position shown in Figure 3 of the drawings.

The end closure plate 21 is provided with a central hub or boss 25 which projects axially therefrom. This hub or boss is hollow to enclose a packing or sealing means and is provided with an aperture 26 therethrough through which the drive shaft 27 may extend. The outer ring 29 of a ball bearing 30 is frictionally supported within the hub 25, the inner ring 31 of this bearing encircling the drive shaft 27. A ring 32 is frictionally supported in the hub 25 adjacent the aperture 26 and forms a rotary seal with relatively rotatable rings 33. A spring 34 is interposed between the sealing rings 33 and a ring or washer 35 bearing against the inner ring 31 of the bearing 30. Another type of suitable seal may be substituted for the specific seal illustrated.

The clutch rotor 36 is shown integral with the drive shaft 27 and is thus rotatable therewith.

The rotor 36 fits with a close running fit against the inner surface 24 of the casing shell 11 at one point in its periphery. As the rotor 36 is eccentrically mounted relative to the inner surface 24, a crescent shaped space is provided between the rotor and the inner shell surface. The rotor 36 is provided with a substantially cylindrical recess 37 in the end thereof opposite that connected to the shaft 27 to accommodate the outer ring 39 of the bearing 16. Thus the clutch rotor and the shaft 27 are rotatably supported by the bearings 16 and 30 and rotate freely within the shell 27. The rotor is of proper width to fit snugly between the disc-like closure 12 of the housing and the closure plate 21.

A series of radially extending apertures 40 extend outwardly from the center of the rotor 36 in angularly spaced relationship. These apertures 40 include a relatively small diameter portion 41, a larger diameter portion 42, and a still larger diameter portion 43 adjacent the outer periphery of the rotor. Apertured externally threaded ring shaped plugs 44 are threaded into the largest diameter portion 43 of the apertures 40 and act as a means of holding the ring shaped valve seats 45 in place. The valve seats 45 also fit within the largest diameter bore portions 43 and are provided with integral projecting sleeves 46 which act as valve seats. Radially movable valve members 47 are slidable in the center portions 42 of the apertures 40. These valve elements 47 are movable from an inner position where they engage the shoulders 49 between the different diameter portions 41 and 42 of the apertures and a position abutting the valve seats 45. A projecting plug 50 on each of the valve elements 47 is designed to seat against the valve seats 45 in closed position of the valves.

Figure 5:
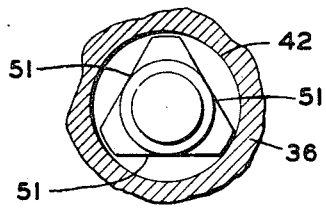
Figure 5 is a view of a valve member forming a part of the valve illustrated in Figure 4.

The valve elements 47 do not fit within the cylindrical bore 42 snugly about their entire periphery. As illustrated in Figure 5 of the drawings these valve elements 47 are provided with a plurality of flat or grooved sides 51 which space substantial portions of the valve element from the walls of the bore 42. As a result fluid may pass the valve element 47 freely when the valve is in the open position illustrated in Figure 3 of the drawings. When the plug portion 50 is against the seat 46, the valve is closed and no fluid may pass the valve element.

Springs 52 may be provided for holding the valve elements 47 in any desired position. Under normal circumstances the springs 52 are provided between the valve seat member 45 and the valve elements 47 so as to hold the valves 47 inwardly. These springs 52 may thus act to counteract centrifugal force to a greater or lesser extent depending upon the resilience of the spring. The springs 52 may be omitted when it is desired that the valves 47 act more quickly to prevent relative movement between the rotor and the clutch housing. As a matter of fact the springs 52 may if desired actually be positioned on opposite sides of the valve elements 47 where the clutch travels at relatively low speed or where the force tending to open the valves is sufficient to counteract both centrifugal force and the springs.

As illustrated in Figure 2 of the drawings a radially extending bore 53 is provided which is axially spaced from each of the apertures 40. A passage 54 which extends in an axial direction connects the common chamber 55 inwardly of the clutch rotor and the apertures 53. The inner end 56 of each passage 54 is reduced in diameter to form a shoulder within the aperture against which a cup-shaped valve element 57 may seat. A spring 59 urges each valve element 57 against its seat. An opening 60 through the wall of each valve element 57 communicates with the outlet bore 53 so as to allow fluid trapped behind the valve elements 57 to escape. This hole 60 also allows fluid under pressure to pass through the valve element from the bore 53 to exert pressure against the end of the valve element. A plug 61 closes the end of each passage 54 and is threaded into place to form an adjustment for the spring 59.

The rotor 36 is provided with an angularly spaced series of slots 62 which extend radially into the casing. These slots are designed to accommodate flat vanes 63. The vanes 63 are radially slidable in the slots 62 and apertures 64 are provided between the bases of the slots 62 and the chamber 55 within the rotor to permit free movement of the vanes. The outer end of each vane is provided with a generally cylindrical transversely extending support 65 connected along its inner edge integrally to the vane 63. Substantially semi-cylindrical shoes 66 are pivotally mounted upon the supports 65, each shoe having a rounded transversely extending socket 67 for accommodating its support. The outer surface of each shoe 66 is arranged on an arcuate plane having a radius similar to the inner surface 24 of the rotor casing. If desired a transversely extending groove 69 may be provided in the arcuate surface so as to decrease the frictional engagement between each shoe and the casing surface 24. As is believed obvious from the description the shoes 66 pivot sufficiently to maintain proper engagement with the inner rotor casing surface as the rotor rotates concentrically therein.

Figure 3:
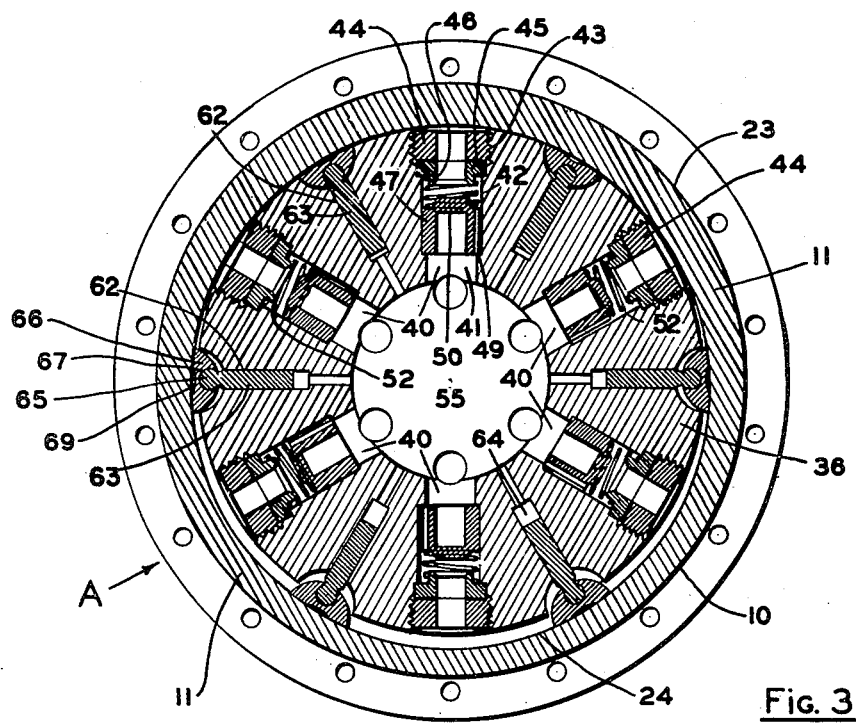
Figure 3 is a sectional view through the clutch the position of the section being indicated by the line 3—3 of Figure 2.
Figure 4:
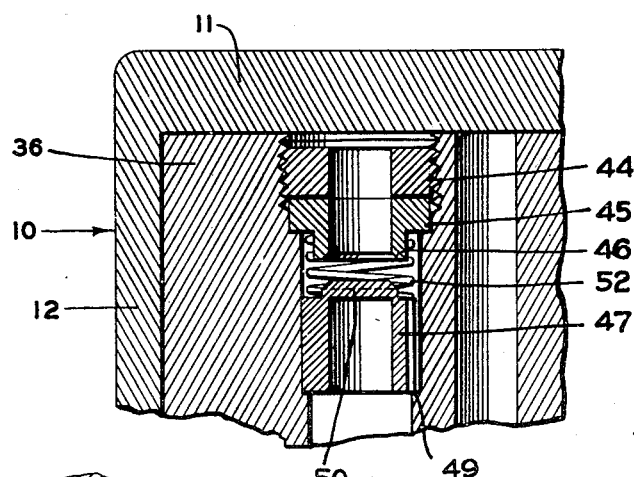
Figure 4 is an enlarged sectional detail showing the construction of certain of the valves of my clutch.

The operation of my hydraulic clutch or torque convertor will now be described in detail. As indicated in Figure 3 of the drawings, the rotor 36 substantially contacts the inner surface 24 of the outer casing 10 at one point, which, in the position shown in Figure 3 of the drawings, is shown at the top of the rotor. As the rotor 36 rotates in either direction from this point of substantial contact toward the point of greatest spacing between the rotor and casing (shown at the bottom of the rotor in the position shown in Figure 3), the vanes 63 slide outwardly in their slots due to centrifugal force and the pressure of any fluid in the passages 64. As the vane shoes 66 slide along the inner surface 24 of the outer casing they change angularity to some extent so as to conform with the contour of the arcuate surface 24. Any liquid forwardly of the vanes during this part of the revolution is merely driven forwardly of the vanes and shoes as the volume of the space between the rotor and its casing is constantly increasing. Furthermore, due to the creation of a partial vacuum between each adjacent pair of vanes and the pressure of fluid within the rotor chamber 55, fluid from the interior of the rotor is permitted to flow outwardly in the apertures 40 if the valve elements 47 are in open position, and may flow outwardly through the bores 53 past the valves 57. The partial vacuum behind the valve elements 57 and the pressure within the chamber 55 is sufficient to open these valves and to allow fluid to flow outwardly through the passages 53.

As each vane passes the point of greatest eccentricity of the casing 10, the shoes 66 are urged gradually inwardly by engagement with the casing surface 24, thus forcing the vanes 63 inwardly. Liquid in the space between each adjacent pair of vanes must then be forced from this space if the rotor 36 is to continue its relative rotation. Pressure is created forwardly of each vane and this pressure is communicated through the bore or passage 53 and through the aperture 60 to the space to the right of the valve elements 57 as viewed in Figure 2. The corresponding valve 57 is then closed by the pressure which exceeds the pressure within the rotor chamber 55. Thus the only avenue of escape for the liquid forwardly of each vane is past the valve elements 47. As the centrifugal force against the valve elements 47 is sufficient to over-balance the force of fluid tending to open the valve, the valve elements 47 remain closed and the rotor can not rotate within its casing. On the other hand if the centrifugal force acting upon the valve elements 47 is less than the force of fluid tending to open the valves 47, the valves will open allowing fluid to flow into the rotor chamber 55. It should be noted that the springs 52 in the position illustrated also assist in counter-balancing centrifugal force and liquid within the chamber 55 adds to the centrifugal force tending to close the valves 47.

The valve elements 47 are designed to be of proper weight and size to accomplish the desired result in each hydraulic clutch. Obviously by making the valves 47 heavier they will be closed by centrifugal force at a lower rate of speed. Furthermore, by changing the area of these valve elements acted upon by fluid on opposite sides of the valve the operation of the valve may be varied. Substantially the proportions illustrated are used in a clutch designed for use as a vehicle torque convertor.

In order to explain a typical operation of the clutch a clutch may be considered as it would appear in use in the drive mechanism of a vehicle. The shaft 27 is connected to the vehicle engine in any suitable manner and the driven stub shaft 13 is connected to the wheels of the vehicle in any desired manner. The fluid clutch may be positioned between the engine and the vehicle differential or each drive wheel may be provided with an independent fluid clutch.

When used in a vehicle it is desirable that the drive shaft may rotate without too great resistance at idling speeds. As the engine rotates at a relatively low rate of speed, as for example below 400 R. P. M., the rotor tends to rotate within the casing and the casing tends to remain stationary. As each vane is successively retracted by contact with the inwardly converging portion of the eccentric casing wall, fluid is forced past the valve element 47 and into the chamber 55. The springs 52 and the pressure created by the liquid as the vanes retract are sufficient to hold the valve elements in open position. As the vanes travel over the diverging portion of the casing wall and move toward projecting position, a partial vacuum is created behind each vane and liquid flows into the space between each pair of spaced vanes as previously described.

By properly proportioning the elements as stated the valves 47 may be made to close against their seat at substantially any desired speed. If, in the foregoing example, the speed of the rotor 36 is increased above 400 R. P. M., the centrifugal force urges the valve elements 47 toward closed position restricting the fluid leaving the space forwardly of each retracting vane. As a result the liquid trapped forwardly of each vane tends to rotate the casing 10 in unison with the rotor 36.

As the speed of the casing 10 increases the pressure tending to open the valve elements 47 decreases. In other words, the maximum torque which may be developed when the engine is accelerated and the vehicle is at rest, decreases. As a result the relative speed between the rotor 36 and the casing 10 decreases until these two elements are locked from relative rotation except for a certain amount of creep which may take place due to leakage of fluid.

Let us consider that the engine of the vehicle was accelerated to a point where the vehicle is travelling at 10 miles per hour when the rotor and casing start movement in unison. If it is desired to accelerate the car so that it will travel 30 miles per hour, the engine accelerator is depressed and the torque acting upon the rotor increases. This torque increase is sufficient to increase the pressure forwardly of the retracting vanes until the valve elements 47 are opened sufficiently to allow relative rotation between the rotor and the casing. This relative rotation continues until the rotor casing picks up speed. The speed of the casing will gradually increase until the rotor and casing are again rotating at approximately an equal speed.

Acceleration of the engine and a consequent increase in torque delivered to the rotor will continue to cause the rotor to rotate faster than the rotor casing until a maximum point is reached. When the rotor reaches a predetermined top speed, the centrifugal force against the valve elements 47 will be sufficiently great to maintain these valves closed. As a result the casing will accelerate with the rotor and travel at substantially the same speed.

As the engine is decelerated, the rotor tends to travel at a slower speed than the casing. This action reduces the centrifugal force upon the valve elements and increases the force tending to open the valves, the rotor then rotating in a reverse direction relative to the casing. The engine tends to act as a brake for the wheels but the liquid is allowed to by-pass and the amount of liquid by-passed gradually increases until the casing may rotate freely relative to the engine until the vehicle comes to a stop.

While my torque convertor or hydraulic clutch has been described as particularly useful on a vehicle, it is obvious that with small changes in design, it may be used as a flexible coupling in places where heavy shock occurs. It may also be used for starting machinery of various types, or with other changes it may be used as a governing device.

In Figure 6 of the drawings I disclose a slightly different passage construction for containing the valves actuated by centrifugal force. In this construction the rotor usually is located within the casing 10. The rotor 70 is identical to the rotor 36 except in the specific construction of the radial apertures in which the centrifugally operated valve elements are located. The rotor 70 is provided with a series of radially extending apertures 71 having cylindrical portions 72 corresponding to the portions 42 of the apertures 40 and larger diameter portions 73 corresponding to the portions 43 of the apertures 40. The inner extremities of the apertures 71 are threaded as indicated at 74 to accommodate a plug 75 having an outwardly projecting hollow boss 76 mounted thereon. The interior of the hollow boss 76 communicates with a hollow interior of the plug 75 and the boss 76 is sufficiently small to fit within the hollow valve element 77 which is identical to the valve element 47. The hollow boss 76 has apertures 79 therethrough and the area of the plug between the boss 76 and the threaded periphery thereof is likewise provided with angularly spaced apertures 80. Thus fluid may flow freely through the plug 75.

The purpose of the plug 75 is to provide a more effective shoulder against which the valve element 77 may engage when in open position. The valve seat element 81 and the hollow plug 82 which are located in the larger diameter portion 73 of the apertures are identical to the parts 45 and 44 respectively which were previously described. In other words, the structure illustrated in Figure 6 is identical to that previously described, except for the fact that a better support is provided for the valve element 77 when this valve element is in open position.

The casing 10 is provided with a passage 83 therethrough which is normally closed by a plug 84. Liquid may be inserted into the casing or removed from the casing through this passage 83 when the plug 84 is removed. The casing is normally filled with fluid to the greatest extent possible while permitting sufficient room for expansion due to heat.

In accordance with the patent statutes, I have described the principles of construction and operation of my hydraulic clutch, and while I have endeavored to set forth the best embodiments thereof, I desire to have it understood that obvious changes may be made within the scope of the following claims without departing from the spirit of my invention.

I claim:

1. A hydraulic clutch including a casing member, a rotor member eccentrically supported in said casing member, a series of angularly spaced vanes supported by said rotor member for radial movement, said vanes being engageable against the inner surface of the casing member during rotation of said rotor member, a fluid chamber within said rotor member, said rotor including a passage from the surface of said rotor member to said fluid chamber between each successive pair of vanes, said passages forming the sole outlet for fluid between said pairs of vanes, a valve seat in each said passage, and a valve supported in each said passage movable toward and away from said seat, said valve being inwardly of said seat and urged toward said seat by centrifugal force, one of said members including return flow passage means from the fluid chamber to the outer extremity of the rotor.

2. The structure defined in claim 1 in which the return passage and means includes a passage connecting said rotor fluid chamber with the periphery of said rotor member between each successive pair of vanes, and a check valve in each return passage.

3. The structure defined in claim 1 in which the valve seats are removably engaged in the outer end of said first named passageways.

4. The structure defined in claim 1 in which the valves include a central plug designed to engage the valve seat, and by-pass passages in said valve inwardly of said plug end.

5. The structure described in claim 1 and including passages between said fluid chamber and the inner ends of said vanes.

6. The structure described in claim 1 in which the return passage means includes a passage between the outer extremity of said rotor member intermediate each successive pair of vanes and said fluid chamber, each return passage including a check valve capable of opening its return passage when the fluid pressure in said fluid chamber exceeds the fluid pressure in that return passageway externally of said check valve.

7. A hydraulic clutch including a rotor casing, a rotor eccentrically mounted in said casing, a series of angularly spaced vanes radially slidable in said rotor, said vanes being projectable against the inner surface of said casing during relative rotation of said rotor, a fluid chamber within said rotor, a series of angularly spaced passages from the outer surface of said rotor to said fluid chamber, said passages being located between each successive pair of vanes, said passages forming the sole outlet for liquid between said pairs of vanes, a valve seat located in each of said passages, a valve element slidable in each passage inwardly of said valve and urged by centrifugal force toward said seat, said valve being engageable with said valve seat to close the passage, a series of second passages extending from the outer surface of said rotor and terminating in an axially directed portion communicating with said fluid chamber, and check valve means movable in a direction parallel to the rotor axis located in said axially directed portions of said second passages.

8. The structure described in claim 7 and including a plug supoprted inwardly of each of said valve elements in said first mentioned passageways past which fluid may flow in any position of said valve elements.

9. The structure described in claim 7 in which the slidable valve element comprises a hollow sleeve having a closed outer end and an open inner end.

10. The structure described in claim 7 in which the slidable valve element in each passage includes a hollow sleeve having a closed outer end and an open inner end, and spring means between each said valve element and each respective valve seat.

11. The structure described in claim 7 in which each slidable valve element comprises a hollow body having a closed outer end and an open inner end, said body having peripheral notch means therein so that liquid can flow past said body in said passages.

12. The structure described in claim 7 and including a plug in each of said first mentioned passages inwardly of said valve and operable to communicate fluid from said fluid chamber to the interior of each slidable valve element, said plug being apertured and said slidable valve elements being hollow.

13. The structure described in claim 7 in which each slidable valve element is hollow, and including an apertured plug inwardly of each said slidable valve elements and extending thereinto to form a communication between said fluid chamber and the interior of the slidable valve.

WILLIAM A. ROTH.

REFERENCES CITED

The following references are of record in the file of this patent:

UNITED STATES PATENTS

| Number | Name | Date |
|---|---|---|
| 1,017,802 | Rich | Feb. 20, 1912 |
| 1,861,909 | Curtis | June 7, 1932 |
| 1,997,788 | Friedell | Apr. 16, 1935 |